United States Patent [19]
Belknap

[11] 3,721,731
[45] March 20, 1973

[54] ALUMINUM TRICHLORIDE PRODUCTION

[75] Inventor: Louis S. Belknap, Hingham, Mass.
[73] Assignee: Cabot Corporation, Boston, Mass.
[22] Filed: Oct. 23, 1070
[21] Appl. No.: 83,323

Related U.S. Application Data

[63] Continuation-in-part of Ser. No. 840,705, July 10, 1969, abandoned.

[52] U.S. Cl. .............. 423/264, 423/495, 423/625, 423/629
[51] Int. Cl. ............ C01f 7/62, C01f 7/58, C01f 7/30
[58] Field of Search ....23/93, 92, 202, 142; 423/495, 423/264, 625, 629

[56] References Cited

UNITED STATES PATENTS

| | | | |
|---|---|---|---|
| 3,343,911 | 9/1967 | Eisenlohr | 23/93 |
| 3,130,008 | 4/1964 | Stokes et al. | 23/142 X |
| 3,406,009 | 10/1968 | Gould et al. | 23/93 |
| 3,052,518 | 9/1962 | Frey | 23/93 |
| 2,768,070 | 10/1956 | Brazaitis | 23/93 X |
| 3,336,731 | 8/1967 | Phillips et al. | 23/93 X |
| 3,384,475 | 5/1968 | Phillips et al. | 23/93 X |

Primary Examiner—Edward Stern
Attorney—Kenneth W. Brown, Arthur S. Collins, Barry R. Blaker and Lawrence A. Chaletsky

[57] ABSTRACT

There is provided a process for the production of aluminum trichloride substantially free from elemental aluminum color impurity. The aluminum trichloride product formed in accordance with the process is especially useful as a feedstock in the further production of white aluminum oxide by vapor phase hydrolysis thereof. Broadly, the process of the invention involves direct primary chlorination of a molten aluminum pool and the injection of further amounts of secondary chlorine into the vaporous effluent from said pool.

4 Claims, 3 Drawing Figures

FIGURE I.

ALUMINUM TRICHLORIDE PRODUCTION

CROSS-REFERENCE

This application is a continuation-in-part of my copending application, U.S. Ser. No. 840,705, filed July 10, 1969 now abandoned.

THE PRIOR ART

The production of aluminum trichloride by direct chlorination of molten aluminum metal is well-known. Generally, the process is carried out by providing an enclosed molten aluminum pool held at above the melting point of the metal (1,220°F). In order to assure maximum rates of production or throughput, it is normally desirable that the molten aluminum be heated to a temperature of between about 1,250°F. and about 1,400°F. Primary chlorine reactant is sparged into the body of the melt, preferably at a rate calculated to provide a sufficient exotherm to maintain a net heat balance with the heat losses from the reaction bed. Accordingly, the rate of chlorine injection represents a primary reaction rate determinant while the aluminum bed itself represents an excess reactant concentration.

Various species of aluminum chloride products of reaction are formed in accordance with the following equations:

Equation 1

$$2Al + 3Cl_2 \rightarrow Al_2Cl_6$$

Equation 2

$$2Al + 3Cl_2 \rightarrow 2AlCl_3$$

Equation 3

$$Al + Cl_2 \rightarrow AlCl_2$$

Equation 4

$$2Al + Cl_2 \rightarrow 2AlCl$$

The aluminum trichloride and hexachloride (dimer) species formed by the reactions of Equations 1 and 2 usually predominate as the major useful produce concentration and are, therefore, hereinafter conveniently grouped together under the single term "aluminum trichloride." The aluminum trichloride vapors escape from the surface of the melt and are thereafter collected, such as by condensation, or otherwise utilized as desired. As an example of the latter course, for instance, the vaporous aluminum trichloride efflux from the reaction bed may be conveyed directly into a high temperature hydrolysis environment wherein conversion of the aluminum trichloride to finely-divided particulate alumina product takes place:

Equation 5

$$2AlCl_3 \text{ (vapor)} + 3H_2O \text{ (vapor)} \xrightarrow{>2000°F} Al_2O_3 + 6HCl \uparrow$$

The thermal and water vapor requirements of the reaction depicted in Equation 5 are normally satisfied by effectuation of a combustion reaction in an enclosed zone between a fuel gas and an oxygen-containing gas. Hydrogen and air serve admirably in this role:

Equation 6

$$2H_2 + O_2 \rightarrow 2H_2O + \text{heat}$$

The aluminum trichloride vapor is injected into the fuel gas/oxygen-containing gas mixture prior to, during or subsequent to the combustion reaction. Further details relating to aluminum trichloride production by the aforedescribed general process may be had by reference to such patent literature as U. S. Pat. Nos. 1,165,065, 3,052,518, 2,849,518, 2,849,293, 2,768,070 and 3,399,029. Likewise, a more detailed and specific understanding of alumina production by vapor phase hydrolysis of aluminum trichloride attention is to be had by reference to U. S. Pat. No. 3,130,008. It is to be noted that the above cited patent literature is intended to be specifically incorporated herein by reference.

In any case, one of the problems that has heretofore confronted the aluminum trichloride producing art resides in the extreme difficulty in providing a product which is free of color impurity. This problem is particularly acute when the aluminum trichloride is to be utilized further as a feedstock in vapor phase hydrolysis alumina production because the presence of such color impurity in the aluminum trichloride can carry over into the alumina product, often rendering said alumina product unfit for its intended applications.

In U. S. Pat. No. 3,343,911, to Douglas H. Eisenlohr, issued Sept. 26, 1967, there is disclosed a process which represents a partial solution to the problem of color adulteration during aluminum trichloride production. Briefly, said process of Eisenlohr comprises the cooling of the primary reaction zone efflux of an aluminum/chlorine reaction to below about 1,00°F. Upon said cooling, elemental aluminum is formed by disproportionation of the aluminum monochloride content of said efflux and plates out upon enclosing conduit walls. At or below this 1,000°F maximum efflux temperature a secondary charge of chlorine is injected into the conduit so as to contact said elemental aluminum and chlorinate same to aluminum trichloride. Since the temperature of contact is below about 1,000°F, allegedly little or no further formation of aluminum monochloride by-product takes place, thereby obviating the possibility of the formation of substantial further amounts of elemental aluminum downstream of said secondary chlorine injection by virtue of the aforedescribed aluminum monochloride disproportionation reaction. Said process of Eisenlohr is clearly of substantial aid in reducing the amount of elemental aluminum and coloration in the end-product aluminum trichloride. However, it has been my experience that said process does not entirely eliminate elemental aluminum contamination of the aluminum trichloride, probably due to the fact that significant amounts of the elemental aluminum originally formed in the aluminum monochloride disproportionation reaction can still be entrained and conveyed completely through the relatively cool conduit system without plating out on the surfaces thereof. Thus, said entrained aluminum is not contacted for a sufficiently lengthy period of time with the secondary chlorine charge to result in substantially complete conversion thereof to aluminum trichloride at temperatures below 1,000°F as called for by Eisenlohr.

In accordance with the present invention, however, color contamination of the aluminum trichloride product of a molten aluminum/chlorine reaction is substantially completely avoided.

OBJECTS OF THE INVENTION

It is a principal object of the invention to provide an improved process for the production of aluminum trichloride by direct chlorination of molten aluminum metal.

It is another object of the invention to provide aluminum trichloride of enhanced color purity.

It is yet another object of the present invention to provide improved aluminum trichloride feedstocks for conversion by hydrolysis to alumina.

It is still another object of the invention to provide an improved process for the production of finely-divided particulate alumina having substantially improved color purity.

Other objects and advantages of the invention will in part be obvious and will in part appear hereinafter.

BROAD DESCRIPTION OF THE INVENTION

In accordance with the present invention it has been discovered that the above objects and advantages are provided when, in the direct chlorination of an enclosed molten aluminum bed to produce aluminum trichloride, additional secondary chlorine is contacted with the vaporous reaction product efflux of said bed at temperatures of above about 1,000°F and prior to cooling of said efflux to more than about 200°F below the temperature of the molten aluminum bed.

THE DRAWINGS

FIG. 1 is a graphic representation of typical equilibrium mole ratios of aluminum trichloride, aluminum dichloride and aluminum monochloride products resulting from the direct primary chlorination of molten aluminum. Said ratios are shown as a function of temperature of the molten aluminum.

FIG. 2 is a graphic representation of typical production rates of aluminum monochloride, aluminum dichloride and aluminum trichloride at a primary constant chlorine injection of about 125 lbs./hour into a molten aluminum pool of about 5,000 lbs. The curves are plotted against temperature and primary chlorine injection rates. In view of the fact that, as mentioned above, the primary chlorine rate is normally the production rate determining step, said rate also normally determines steady state operational temperatures.

FIG. 3 is a schematic side view of (1) an aluminum trichloride generator adapted to carry out either the improved process of the present invention or the process of the aforecited Eisenlohr patent, (2) a typical aluminum trichloride vapor hydrolyzing burner in operative combination with said generator, and (3) condenser means in operative combination with said generator for collection of aluminum trichloride samples therefrom.

DETAILED DESCRIPTION OF THE INVENTION

Figure 1:
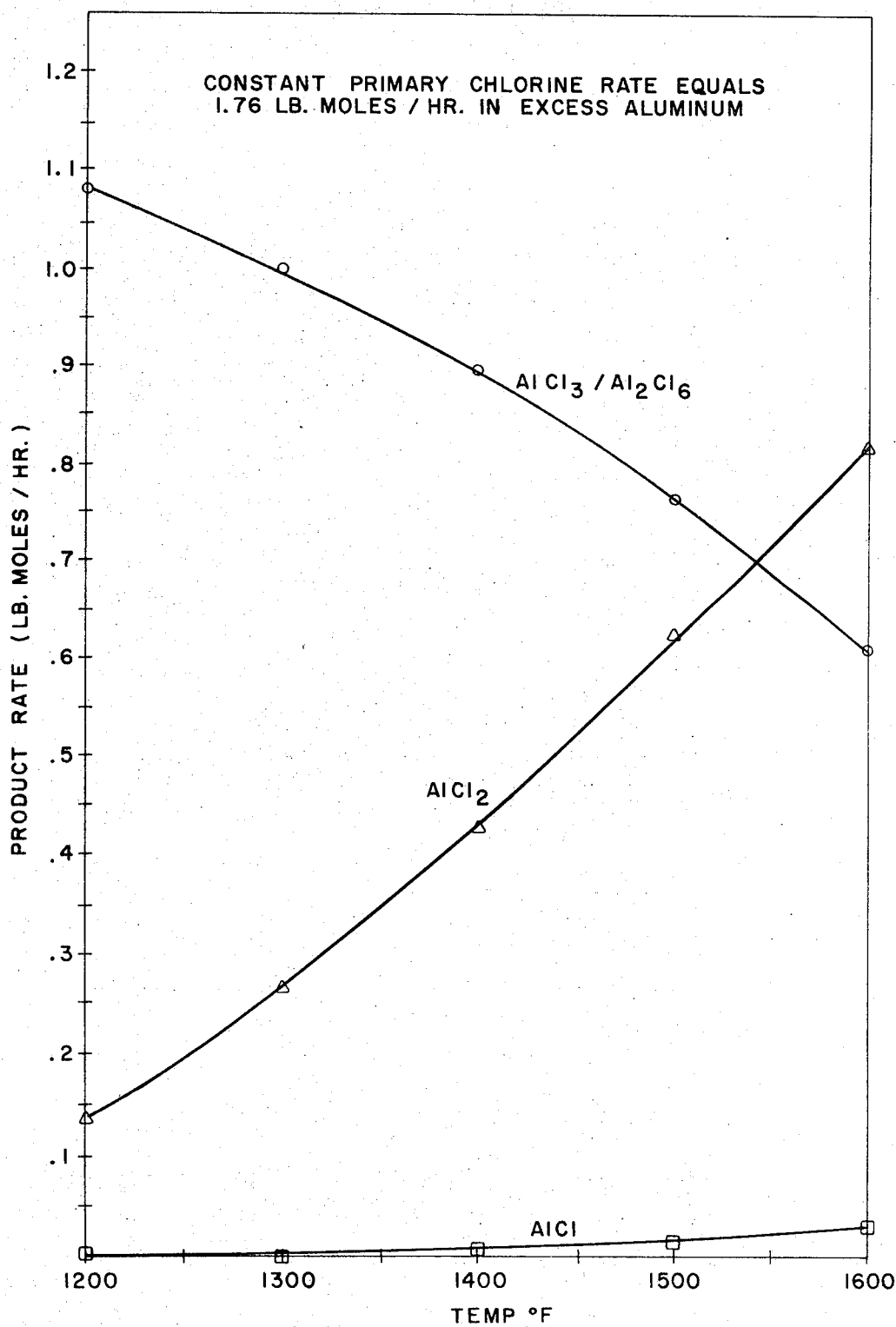
Figure 2:
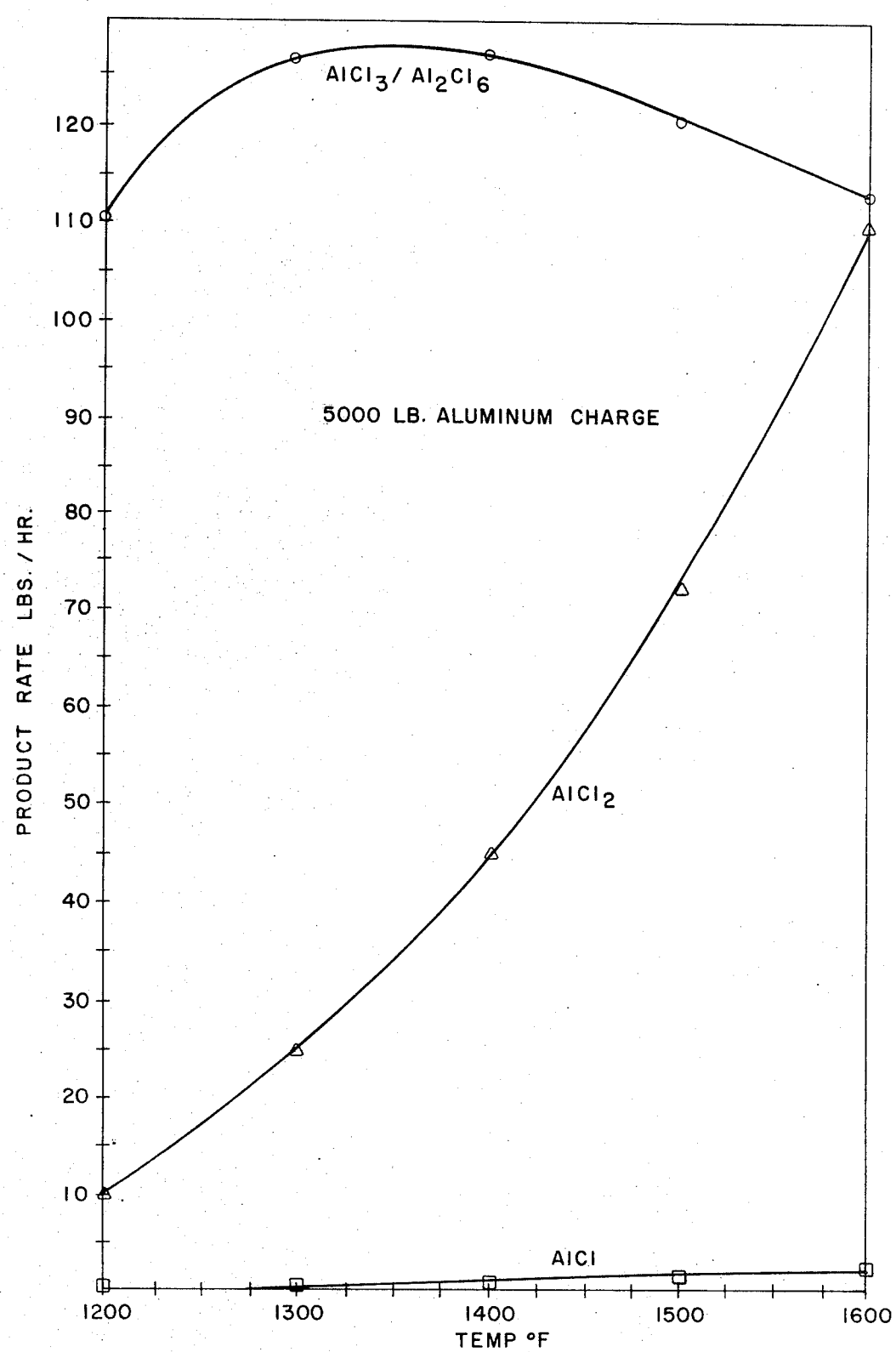

Referring now to FIGS. 1 and 2 and Equations 1–4 it will be seen that the direct chlorination of molten aluminum metal results in the formation of at least four vaporous aluminum chlorides: aluminum hexachloride, aluminum trichloride, aluminum dichloride and aluminum monochloride. As mentioned previously, for purposes of the present invention the aluminum hexachloride dimer product is conveniently grouped with the aluminum trichloride and is thus expressed as such in FIGS. 1 and 2. More importantly, it will be noted that as the production rate of the aluminum trichloride species increases as a function of primary chlorine rate and temperature so, too, does the production rate of the di- and mono-chlorides. In fact, at the optimum throughput temperatures for aluminum trichloride (about 1,250–1,400°F) the monochloride:trichloride and the dichloride:trichloride equilibrium mole concentration ratios are proportionately greater than at lower, less desirable aluminum trichloride throughput temperatures.

It is my belief, although there is no intent to be bound by this explanation, that the aluminum mono- and dichlorides inherently formed as by-products in the direct primary chlorination of the molten aluminum metal are sufficiently unstable to disassociate in accordance with the following overall equations:

Equation 7

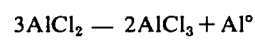

Equation 8

Accordingly, in keeping with this belief, I further propose that a predominant source of color impurity often present in aluminum trichloride collected as product from prior art processes or in hydrolysis alumina subsequently produced therefrom is elemental aluminum metal.

In order to substantially prevent or mollify the aforementioned elemental aluminum forming reactions of Equations 7 and 8, secondary chlorine is additionally injected into the vaporous efflux of the molten aluminum pool prior to cooling thereof by more than about 200°F below the temperature of the molten aluminum bed and to no less than about 1,000°F. Accordingly, a major and critical departure from the teachings of the Eisenlohr patent resides directly in the temperature at which I achieve contact of the secondary chlorine with the vaporous efflux of the molten aluminum reaction bed. Contrary to the teachings of Eisenlohr, who first allows elemental aluminum formation and condensation to occur and only thereafter attempts to rechlorinate said aluminum at a lower temperature, my process relies principally upon the avoidance of the formation of the condensed aluminum by-product in the first instance. Moreover, when a slight excess of chlorine is introduced in the secondary chlorine charge, said excess can remain throughout the conveyance of the aluminum trichloride stream to its enduse application or collection and can thus additionally act as a chlorinating scavenger for whatever trace amounts of aluminum may be present in the system downstream of the secondary chlorine injection point. As will be demonstrated in the Examples forming part hereof, contact of said efflux with the secondary chlorine at above said 1,000°F minimum temperature and prior to cooling thereof to more than about 200°F below the temperature of the molten aluminum bed is all-important in achieving the product color and aluminum purity benefits of the invention. Preferably, the efflux temperature at the time of contact with the secondary chlorine will be between about 1,100°F and about 1,300°F.

The particular method employed to accomplish the injection and contacting of the secondary chlorine with the efflux is not generally critical provided, of course, that good mixing of said secondary chlorine charge with the primary reaction zOne efflux be achieved prior to cooling thereof to below about 1,000°F. Accordingly, it will normally be desirable and convenient to accomplish the secondary chlorine injection directly into the headspace enclosure normally provided directly above the molten aluminum reaction bed. Where the vaporous efflux is conveyed from said reaction bed for substantial distances prior to contacting with the secondary chlorine, it is important that the temperature of said efflux be maintained at or above about 1,000°F and within 200°F of the molten aluminum bed temperature (such as by means of suitable insulation or auxiliary heating) until said contact with the secondary chlorine is effectuated.

While the amount of chlorine to be injected into the vaporous aluminum chloride efflux can be calculated for any particular case from the basis of thermodynamic considerations of the precise chlorination conditions to be employed, it is also a highly practical approach to simply inject the secondary chlorine into the efflux at incrementally increasing rates until the desired color purity of the aluminum trichloride product is achieved. It will be appreciated that the aluminum trichloride process to which the present invention is directed is normally substantially continuous; accordingly, it is convenient that the amount of secondary chlorine utilized be expressed in terms of rate rather than a single quantity. Since the equilibrium mole ratios of aluminum monochloride:aluminum trichloride and aluminum dichloride:aluminum trichloride and the production rates thereof may be determined for any given circumstances as evidenced in FIGS. 1 and 2 it is further obvious that the elemental aluminum formation rates and concentrations of the reactions of Equations 7 and 8 above are second order functions. Normally, the rate of secondary chlorine injection should constitute at least about 5 percent of the primary chlorine rate utilized and, preferably, will constitute between about 10 percent and 30 percent thereof.

There follow a number of non-limiting examples.

EXAMPLE 1

Figure 3:
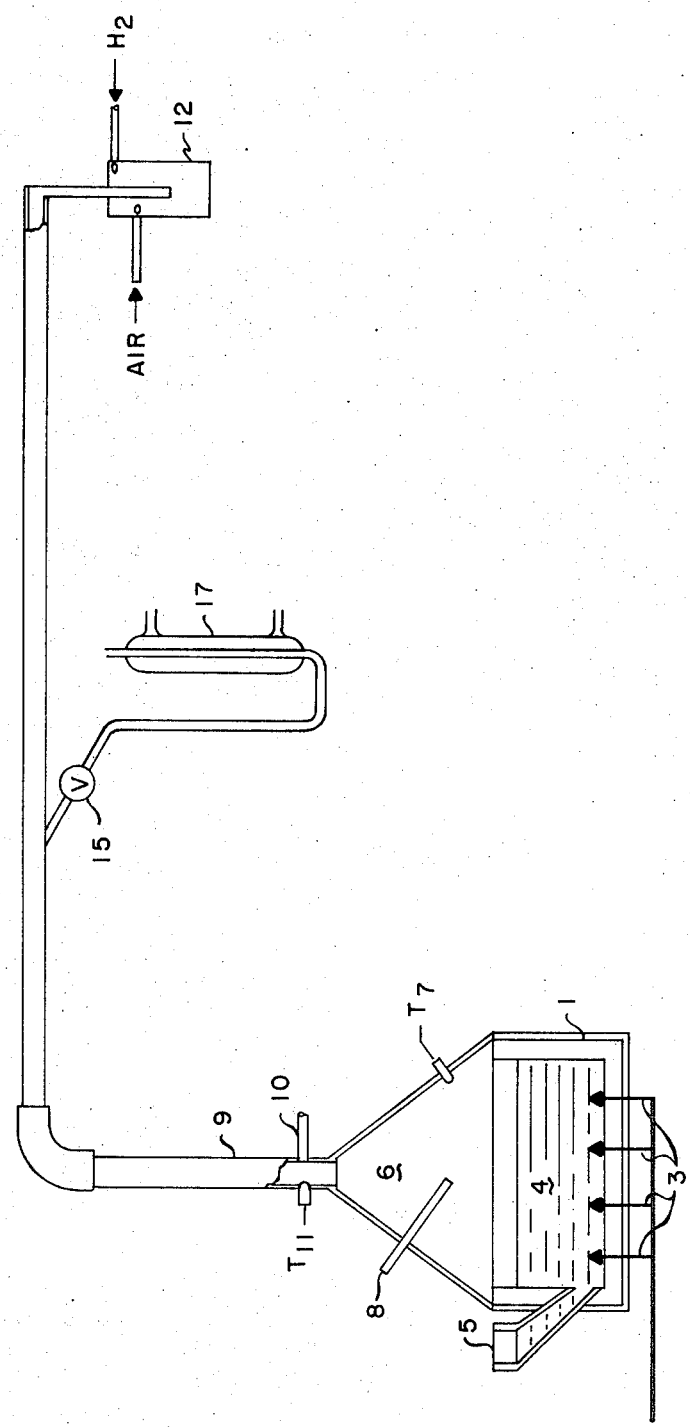

Referring now to FIG. 3, about 5,000 lbs. of molten aluminum metal is charged through port 5 into refractor lined aluminum chloride generator 1, equipped with chlorine injectors 3. Next, there is continuously charged through said injectors 3 about 100 lbs./hour of chlorine, at which charge rate the temperature of molten pool 4 is maintained relatively constant at about 1,350°F. The gaseous aluminum chloride efflux emanating from the surface of said pool 4 is entrapped in enclosure 6 and conducted through about 300 feet of insulated conduit 9 to a 2 inch bore hydrolysis reactor 12. The temperature within said enclosure 6 is monitored by thermocouple 7 and is found to be about 1,200°F, while the temperature at the upstream end of conduit 9 is monitored by thermocouple 11 and is found to be about 950°F. A hydrogen/air mixture is continuously burned in said reactor 12 at flow rates of about 930 SCFH of hydrogen and about 3,200 SCFH of air. The solid finely-divided alumina reaction product resulting from the injection of the aluminum chloride vapor into said combusting H₂/air mixture is collected by means of conventional bag filter apparatus (not shown). The collected finely-divided alumina product is dispersed at a 30 weight percent loading thereof in water, examined and found to possess a dark grey color. Next, without change in the above operating conditions, valve 15 located about 250 feet downstream from enclosure 6 is opened, thereby diverting a small portion of the vaporous aluminum chloride stream from conduit 9 into condenser 17 wherein, through indirect heat exchange, the aluminum trichloride vapors are solidified and collected. Examination of the collected aluminum trichloride sample also reveals that the product possesses a greyish color.

EXAMPLE 2

The aluminum chloride producing run of Example 1 is continued with the added feature that there is additionally continuously charged through injector 8 into enclosure 6 about 30 lbs./hour of chlorine. Substantially immediately after start-up of this secondary chlorine injection the color of the alumina collected from reactor 12 is noted to improve. After about 2 hours of operations under these conditions, the color of a 30 weight percent aqueous dispersion of the alumina product is found to be substantially color-free. Valve 15 is then reopened as before and the aluminum chloride product thus collected in condenser 17 is also found to be substantially free from grey coloration.

EXAMPLE 3

The aluminum trichloride producing run of Example 2 is continued with the exception that the secondary chlorine injection is accomplished through injector 10 located at the entrance to conduit 9 rather than through injector 8. As previously mentioned, the temperature of the aluminum chloride efflux entering said conduit 9 is about 950°F. Shortly after switching over of the secondary chlorine injection from said injector 8 to said injector 10 it is noted that the color of aqueous suspensions containing the alumina product collected from reactor 12 again begin to grey. At the end of a two hour period of operations under the aforesaid conditions, the color of such suspensions is found to be nearly as grey as that resulting from the procedure of Example 1 wherein no secondary chlorine injection is accomplished. Further, a sample of aluminum trichloride product collected in condenser 17 is also discovered to be grey colored.

EXAMPLE 4

This example is procedurally a duplicate of Example 2 with the exception that the primary chlorine charge rate is reduced to about 70 lbs./hour. Accordingly, the pertinent temperatures achieved during steady state operations are as follows: aluminum melt, 1,275°F and enclosure 6, 1,050°F. The temperature of enclosure 6 is, therefore, about 225°F cooler than the temperature of the aluminum melt.

Under these conditions, it is found that 30 percent aqueous dispersion samples of product collected from reactor 12 are slightly grey in color as compared to the substantially white alumina product of Example 2.

What is claimed is:

1. In a process for producing aluminum trichloride vapors comprising sparging a molten aluminum bed with primary chlorine in an enclosed zone having a headspace thereabove at bed temperatures of between 1,250°F and 1,400°F, thereby to produce a vaporous efflux from said bed composed predominantly of aluminum trichloride and further containing therein color adulterating amounts of any or all of elemental aluminum, aluminum dichloride and aluminum monochloride, the improvement which comprises improving the color purity of the aluminum trichloride product by injecting a small but effective amount of secondary chlorine into said headspace and contacting the vaporous efflux of said bed therewith at a temperature of between 1,100°F and 1,300°F and at a minimum temperature of 200°F below the temperature of the molten aluminum bed.

2. The process of claim 1 wherein the amount of secondary chlorine utilized represents above about 5 percent by weight of the primary chlorine utilized.

3. The process of claim 1 wherein the resulting vaporous aluminum trichloride product stream is subsequently utilized in the production of alumina by vapor phase hydrolysis thereof.

4. The process of claim 1 wherein the resulting vaporous aluminum trichloride product stream is condensed and collected as solid product.

* * * * *